United States Patent
Schluesselbauer

(10) Patent No.: US 9,016,343 B2
(45) Date of Patent: Apr. 28, 2015

(54) DEVICE FOR WELDING A TUBULAR LINING OF A WASTEWATER PIPE

(76) Inventor: Johann Schluesselbauer, Altenhof am Hausruck (AT)

( * ) Notice: Subject to any disclaimer, the term of this patent is extended or adjusted under 35 U.S.C. 154(b) by 65 days.

(21) Appl. No.: 13/997,377

(22) PCT Filed: Jan. 18, 2012

(86) PCT No.: PCT/AT2012/050010
§ 371 (c)(1),
(2), (4) Date: Jun. 24, 2013

(87) PCT Pub. No.: WO2012/109688
PCT Pub. Date: Aug. 23, 2012

(65) Prior Publication Data
US 2013/0269878 A1   Oct. 17, 2013

(30) Foreign Application Priority Data
Feb. 18, 2011 (AT) .................................. A 218/2011

(51) Int. Cl.
*B29C 53/40* (2006.01)
*B29C 65/12* (2006.01)
(Continued)

(52) U.S. Cl.
CPC .............. *B29D 23/001* (2013.01); *B29C 53/40* (2013.01); *B29C 66/86533* (2013.01); *B29C 53/46* (2013.01); *B29C 65/12* (2013.01); *B29C 65/7835* (2013.01); *B29C 65/7841* (2013.01); *B29C 66/02245* (2013.01);
(Continued)

(58) Field of Classification Search
CPC ........ B29C 53/04; B29C 53/40; B29C 65/12; B29C 65/7835; B29C 65/7841; B29C 66/02245; B29C 66/1142; B29C 66/4322; B29C 66/86533; B29C 53/46; B29D 23/001
USPC .......... 156/218, 443, 497, 499, 535; 228/17.5
See application file for complete search history.

(56) References Cited

U.S. PATENT DOCUMENTS

| 5,795,431 A | 8/1998 | Weissfloch |
| 2008/0190550 A1 | 8/2008 | Groppe et al. |
| 2009/0031677 A1 | 2/2009 | Beinghaus et al. |

FOREIGN PATENT DOCUMENTS

| DE | 92 14 574 U1 | 12/1992 |
| DE | 296 17 164 U1 | 1/1997 |

(Continued)

OTHER PUBLICATIONS

International Search Report of PCT/AT2012/050010, date of mailing Sep. 19, 2012.

*Primary Examiner* — Michael Tolin
(74) *Attorney, Agent, or Firm* — Collard & Roe, P.C.

(57) ABSTRACT

An apparatus for welding a tubular lining of a wastewater pipe includes a retainer for the butt-jointed longitudinal edges, which are to be welded, of a plastic panel bent to form a pipe, and a welding apparatus. The retainer includes one respective clamping device for each edge formed by a stationary clamping bar on the outside of the pipe and a movable clamping bar on the inside of the pipe which is connected to an actuating drive. The stationary clamping bars are located opposite of one another with respect to the butt joint between the two longitudinal edges while leaving a gap open. At least one of the two movable clamping bars forms a stop for one longitudinal edge of the plastic panel in a position placed against the associated stationary clamping bar. A guide is provided along the gap between the stationary clamping bars for the welding device.

6 Claims, 4 Drawing Sheets

(51) Int. Cl.
*B29D 23/00* (2006.01)
*B29C 65/00* (2006.01)
*B29C 53/46* (2006.01)
*B29C 65/78* (2006.01)

(52) U.S. Cl.
CPC ........ *B29C 66/1142* (2013.01); *B29C 66/4322* (2013.01); *B29C 66/49* (2013.01); *B29C 66/836* (2013.01); *B29C 66/865* (2013.01)

(56) References Cited

FOREIGN PATENT DOCUMENTS

DE 20 2007 012262 U1 12/2007
EP 0834389 A2 * 4/1998

* cited by examiner

DEVICE FOR WELDING A TUBULAR LINING OF A WASTEWATER PIPE

CROSS REFERENCE TO RELATED APPLICATIONS

This application is the National Stage of PCT/AT2012/050010 filed on Jan. 18, 2012, which claims priority under 35 U.S.C. §119 of Austrian Application No. A 218/2011 filed on Feb. 18, 2011, the disclosure of which is incorporated by reference. The international application under PCT article 21(2) was not published in English.

FIELD OF THE INVENTION

The invention relates to an apparatus for welding a tubular lining of a wastewater pipe, comprising a retainer for the butt-jointed longitudinal edges, which are intended to be welded, of a plastic panel bent to form a pipe, and comprising a welding apparatus.

DESCRIPTION OF THE PRIOR ART

In order to achieve effective protection from corrosion for wastewater pipes made of concrete, especially in the case of chemically contaminated wastewater, it is known to provide the wastewater pipes with an inner lining made of a plastic material which is resistant against such chemical attacks, e.g. polyethylene. For this purpose, a pipe is produced at first from a rectangular plastic panel, wherein the butt-jointed longitudinal edges of the plastic panel bent into a pipe are welded together. The plastic pipe is then used as a permanent shuttering for the concrete pipe to be cast in a mould with the plastic pipe as the core. The production of the plastic pipe that will form the later inner lining of the wastewater pipe is especially complex in this connection because the longitudinal edges of the plastic panel to be bent into a pipe need to be joined precisely for the subsequent welding and need to be tightly held in the joining position during the welding process, which leads to considerable difficulties in the usual handling of these plastic pipes.

SUMMARY OF THE INVENTION

The invention is therefore based on the object of providing an apparatus with the help of which the joining and the subsequent welding of the butt-jointed longitudinal edges of a plastic plate bent into a pipe can be facilitated substantially.

Based on an apparatus of the kind mentioned above, this object is achieved by the invention in such a way that the retainer for the two butt-jointed longitudinal edges of the plastic panel comprises one respective clamping device consisting of a stationary clamping bar on the outside of the tube and one movable clamping bar on the inside of the pipe which is connected to an actuating drive, that the stationary clamping bars are located opposite of one another with respect to the butt joint between the two longitudinal edges while leaving a gap open, that at least one of the two movable clamping bars forms a stop for one longitudinal edge of the plastic panel in a position against the associated stationary clamping bar, and that a guide is provided along the gap between the stationary clamping bars for the welding apparatus.

As a result of the two clamping devices, the butt-jointed longitudinal edges of the plastic panel bent into a pipe can be tightly held in their mutual position for the welding process, so that the welding process can be performed in a simple and precise way by means of the welding device, which will be displaced along the gap between the stationary clamping bars, wherein welding material, preferably in form of a strand, is introduced in the known manner in the gap between the clamping bars. The precondition for clamping that is conducive to welding of the longitudinal edges of the plastic panel to be welded together is however that a predetermined progression of the butt joint can be maintained with high precision for the two longitudinal edges. For this purpose, a stop is provided for one of the two longitudinal edges of the plastic panel which is formed by the movable clamping bar of the clamping device not associated with this longitudinal edge, in that said movable clamping bar which forms the stop will be pressed via its actuating drive against the associated stationary clamping bar, so that the longitudinal edge pushed forward by the open clamping device against the opposite clamping device will strike the closed movable clamping bar of this opposite clamping device and can be tightly held by means of the associated clamping device in this stop position. After the clamping of the one longitudinal edge, the opposite longitudinal edge can be pressed by the associated clamping device, which is open for this purpose, in a butt-jointed manner against the clamped longitudinal edge of the plastic panel in order to also be clamped in this welding position. With the clamping of the two longitudinal edges in the butt-jointed welding position, all preconditions for proper welding of the two longitudinal edges are fulfilled.

The movable clamping bars of the two clamping devices are situated within the pipe formed by the bent plastic panel. This means that the welded pipe can only be drawn of in the axial direction from the clamping devices. In order to ensure such axial drawing off of the welded pipe, the movable clamping bars can be arranged with the actuating drives on a freely protruding support which is parallel to the stationary clamping bars. In the case of larger axial lengths of the plastic panels for producing tubular linings for wastewater pipes, the bending strain on such a freely protruding support can be considerable. In order to enable such bending strains to be absorbed in a good way, a detachable support device can be provided for the free end of the protruding support, which support device ensures bearing of the support on both sides during the clamping and welding of the longitudinal edges of the plastic panel. The detachability of this support device for the free support end is the precondition for the axial withdrawing of the welded tubular lining.

In the simplest of cases, the plastic panels for producing the tubular linings can be introduced by hand with their longitudinal edges into the associated clamping devices. Due to clamping of only one longitudinal edge first, there are generally no difficulties to bend the plastic panels, which are clamped on one side, along a longitudinal edge by hand into a pipe and to introduce the opposite longitudinal edge into the associated clamping device. In order to ensure that the production of the tubular linings can be automated substantially as a permanent shuttering for wastewater pipes made of concrete, one respective deflection guide can be associated with the two clamping devices for the plastic panel to be bent into a pipe, wherein the deflection guide, which belongs to the clamping device with the stop for a longitudinal edge of the plastic panel, is provided on a carriage displaceable transversely to the two deflection guide, which comprises a driver stop for the plastic panel, which driver stop is provided upstream of the deflection guide of the carriage and is displaceable between an idle position and a driver position of the carriage. When a plastic panel which has been prepared for the production of a tubular lining is placed on the carriage provided for this purpose, said flat plastic panel can be conveyed via the driver stop during entrance of the carriage into the apparatus against the deflection guide not belonging to the carriage and can be bent by 180° along this deflection guide in order to be displaced by the opened clamping device associated with this deflection guide against the opposite closed clamping device up to the stop on its clamping bar, so that the longitudinal edge of the plastic panel which rests against the stop formed by this closed clamping bar is tightly held by closing the clamping device associated with this longitudinal edge. After a displacement of the driver stop, the carriage can then be moved from its driver position into an idle position further in the apparatus, wherein the deflection guide associated with the carriage is used. Since the plastic panel is already tightly held along the one longitudinal edge and rests on the deflection guide associated with this clamping device, a relative movement is obtained between the carriage and the plastic panel which is rolled up on one side, which produces the rolling up of plastic panel in the region of the deflection guide associated with the carriage. As a result of the opening of the clamping device forming the stop for the already clamped longitudinal edge, the longitudinal edge of the plastic panel which is deflected by 180° by the deflection guide of the carriage is pushed forward by the associated open clamping device against the tightly clamped longitudinal edge up to the stop. As a result, the second longitudinal edge can also be tightly clamped in the joining position caused by this stop position in order to perform the welding.

In order to ensure that different circumferential lengths for the tubular lining therefore different diameters for this lining can be considered it is necessary to provide sufficient space for accommodating the plastic panel to be bent into a pipe. The carriage to be moved into the apparatus limits the available space for accommodating the plastic panel bent in the manner of a pipe with respect to height. This means that space needs to be provided in the travelling direction of the carriage for larger circumferential lengths. For this purpose, the deflection guide which is opposite to the deflection guide of the carriage can be displaceable transversely to the associated clamping device, so that although this deflection guide forms a support required for the rolling up of the as yet unrolled longitudinal edge for the plastic panel rolled up on one side, this support can be adjusted to the respective circumferential length of the tubular lining to be produced.

Plastic panels that are used for producing inner linings for wastewater pipes usually have a structure in form of protrusions or knobs on the future outside of the outer lining in order to achieve a tight connection between the lining and the concrete pipe. Such a structuring of the surface obstructs the welding process however. For this reason, the welding device can be provided upstream with a milling device, by means of which the protrusions and knobs in the region of the weld seam between the two stationary clamping bars can be removed by cutting.

BRIEF DESCRIPTION OF THE DRAWINGS

The subject matter of the invention is shown in the drawings by way of example, wherein.

DESCRIPTION OF THE PREFERRED EMBODIMENT

Figure 1:
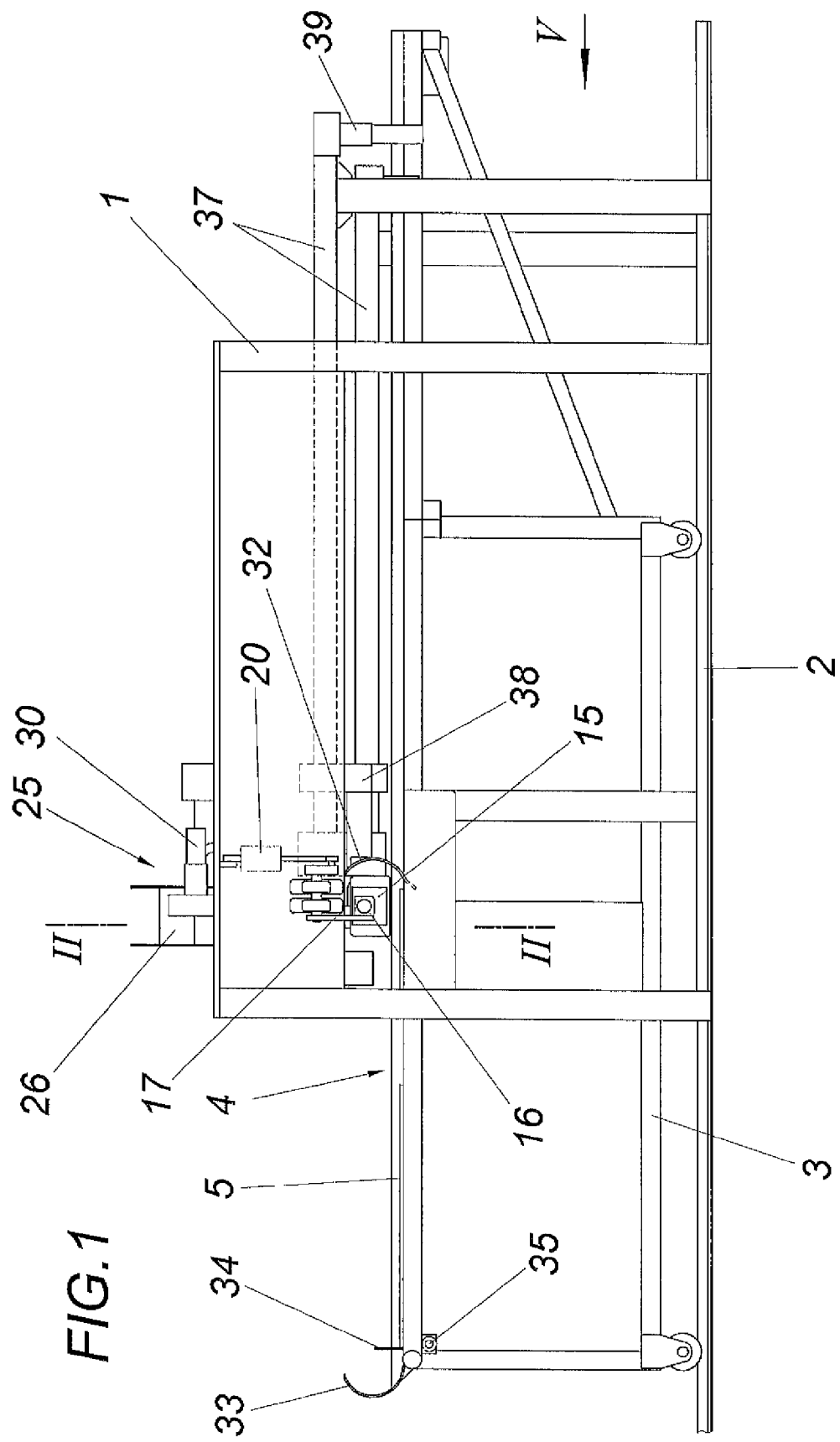
FIG. 1 shows an apparatus in accordance with the invention for welding a tubular lining of a wastewater pipe in a simplified side view.
Figure 2:
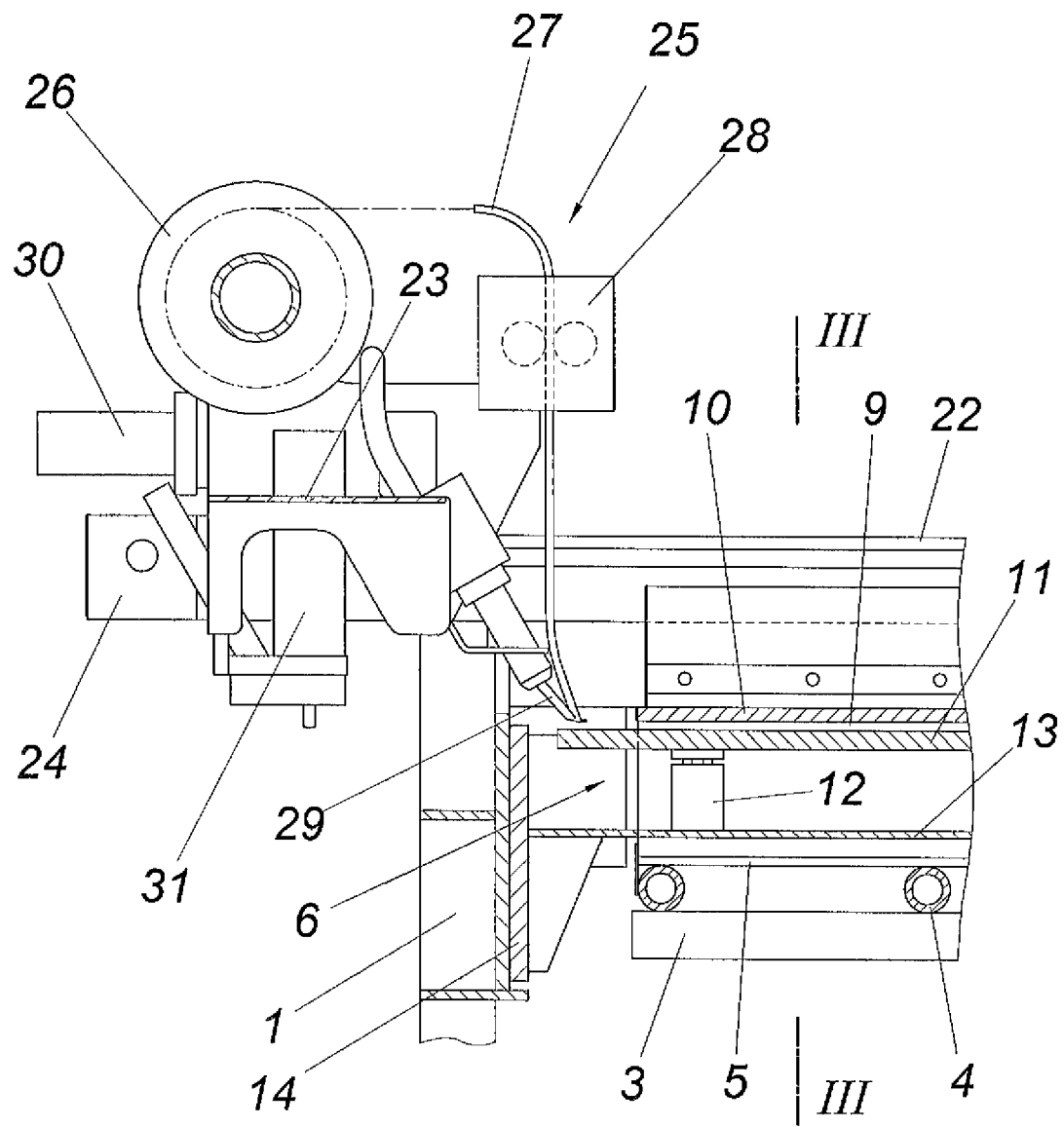
FIG. 2 shows this apparatus in a sectional view along the line II-II of FIG. 1 on an enlarged scale.
Figure 5:
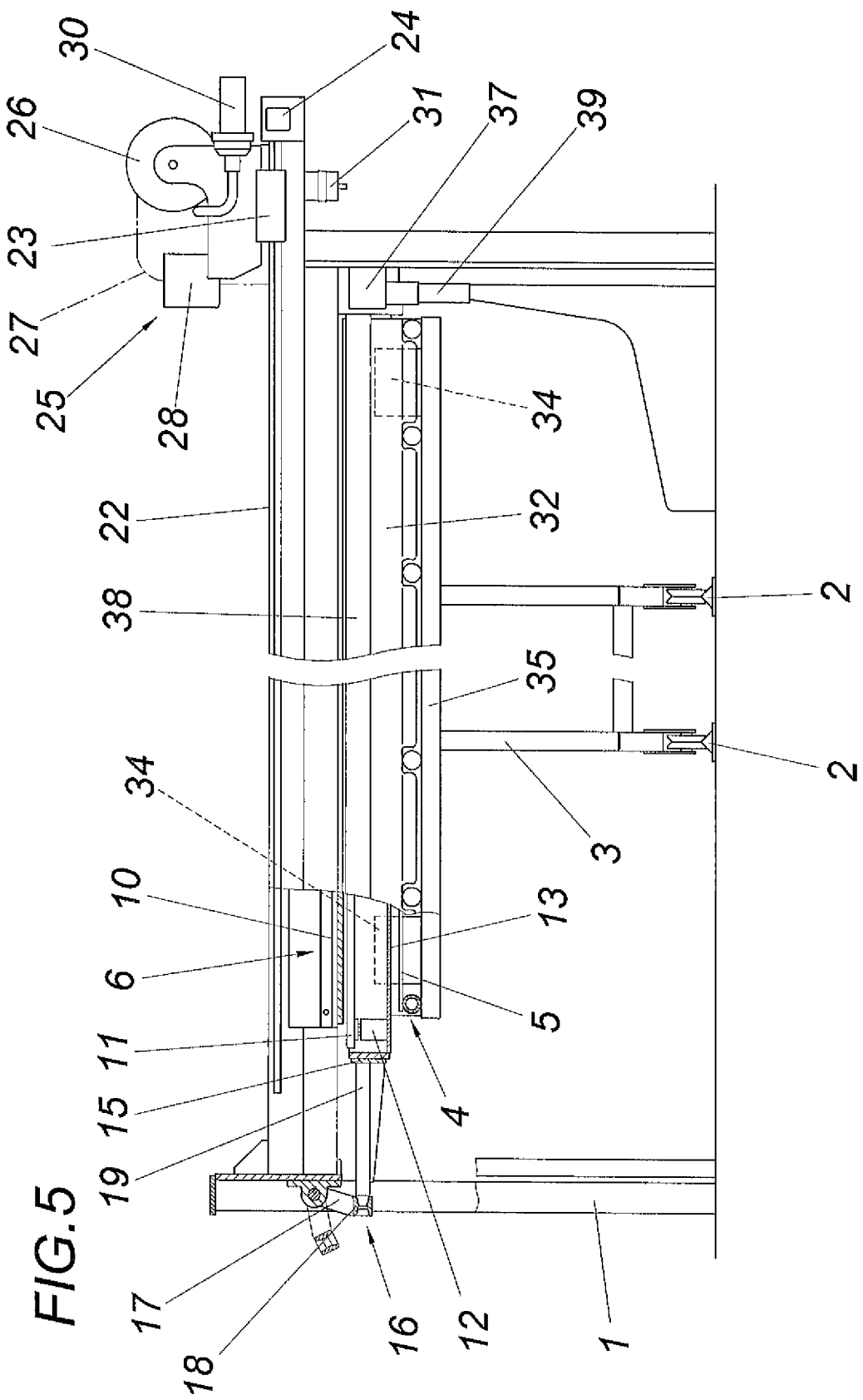
FIG. 5 shows a partly vertical plan view of the apparatus in the direction of arrow V of FIG. 1.

The illustrated apparatus for welding a tubular lining for a wastewater pipe comprises a fixed frame 1 and a carriage 3 which is displaceable relative to said frame 1 on rails 2 and which forms a receiver 4 for a plastic panel 5 that can be bent into a pipe. Two clamping devices 6 and 7 for the butt-jointed longitudinal edges 8 and 9 of the plastic panel 5 bent into a pipe are provided in the frame 1 above the receiver 4 of the carriage 3 for the plastic panel 5. These clamping devices 6, 7 respectively comprise a stationary clamping bar 10 provided on the outside of the pipe and a movable clamping bar 11 which cooperates with these stationary clamping bars 10 and which is connected to an actuating drive 12, e.g. in form of actuating cylinders distributed over the length of the movable clamping bar 11. These movable clamping bars 11, which extend transversely to the rails 2, are arranged with their actuating drives 12 on a support 13 which is substantially U-shaped in its cross-section and which is rigidly connected via a console 14 with the frame 1 according to FIG. 2, and is releasably held with its free end 15 in a support device 16 according to FIG. 5. This support device 16 comprises a pivot lever 17 which forms a bearing receiver 18 for a pin 19 connected to the support end 15. The pivot lever 17 can be pivoted by means of an actuating cylinder 20 shown in FIG. 1 from the support position as shown in FIG. 5 to an open position that is pivoted away from the pin 19, as is indicated by the dot-dash line.

Figure 3:
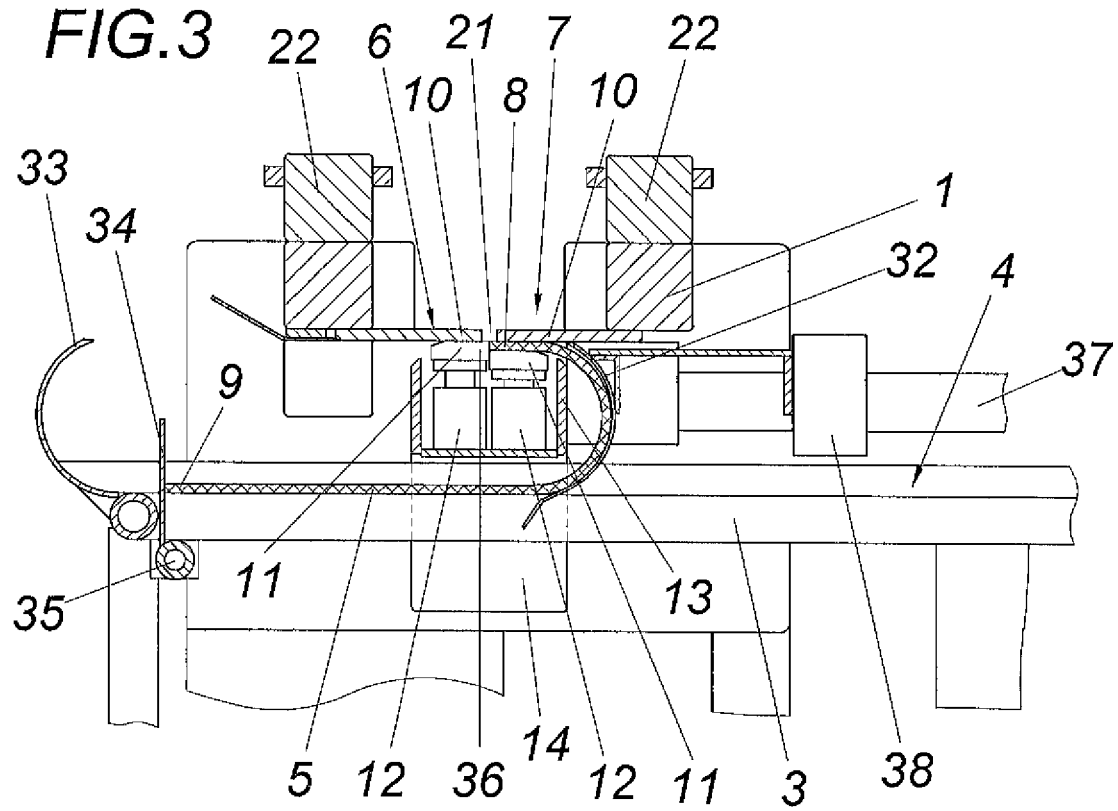
FIG. 3 shows a sectional view along the line III-III of FIG. 2 with a plastic panel rolled up and clamped on one side.
Figure 4:
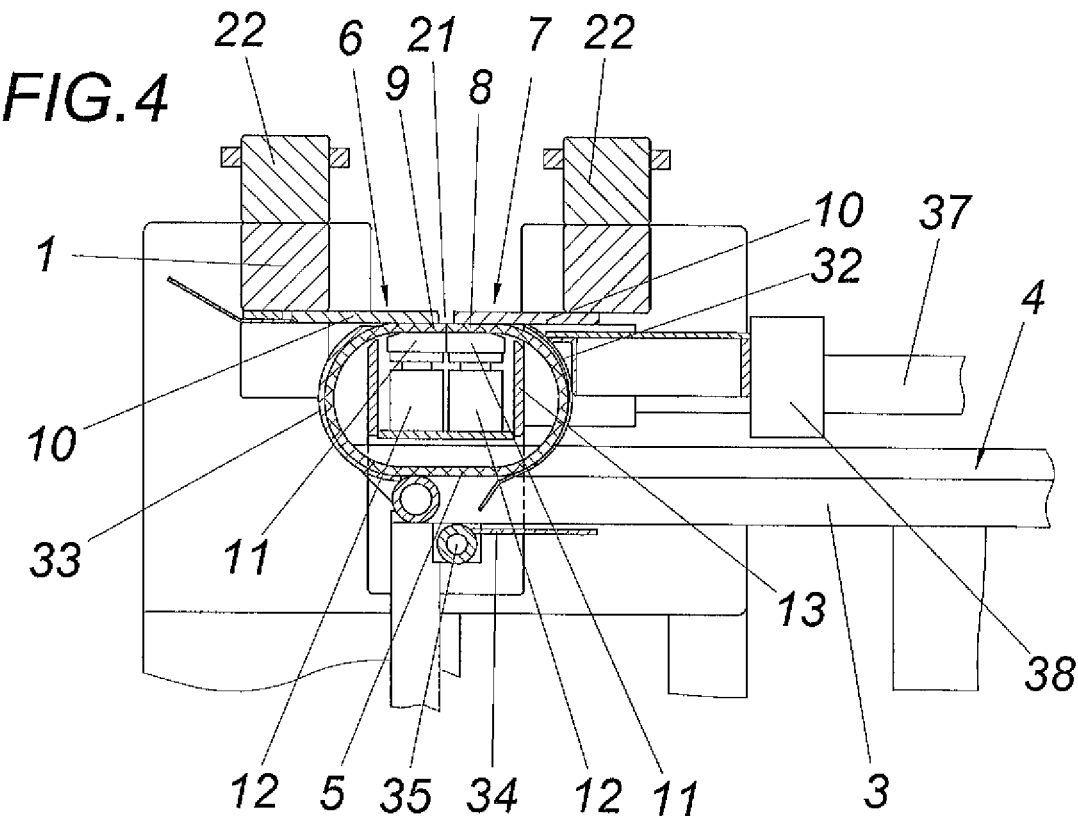
FIG. 4 shows an illustration corresponding to FIG. 3 with a plastic panel clamped in the region of the two longitudinal edges.

The stationary clamping bars 10 of the two clamping devices 6, 7 are situated opposite of one another by leaving a gap 21, as is shown in FIG. 3 and FIG. 4. A guide 22 for a carriage 23 is provided parallel to the gap 21 and therefore parallel to the clamping bars 10 in the frame 1, which carriage can be displaced by means of a motor 24 along the guide 22 and accommodates a welding device 25. This welding device 25 comprises a supply coil 26 in a conventional manner for a strand 27 made of a welding material, which is supplied via a draw-off device 28 to the weld seam which is to be produced in the gap 21 between the two clamping bars 10 and which connects the butt-jointed longitudinal edges 8, 9, which are intended to be connected to each other, of the plastic panel 5 to be bent into a pipe. The heat supply occurs according to FIG. 2 via a hot-air nozzle 29 which is connected to a hot-air fan 30. The welding device 25 is provided upstream in the welding direction with a milling device 31 with a respective suction device for the milling chips in order to cut off any surface structures which may be provided in the region of the weld seam to be performed, which support the connection with the concrete pipe to be lined and which might obstruct deformation of the weld seam. Furthermore, the milling device 31 can be used to prepare the weld seam by processing the butt-jointed longitudinal edges 8, 9, e.g. for forming a V-weld.

The two clamping devices 6, 7 are associated with deflection guides 32 and 33 for rolling up the plastic panel 5 into a pipe. Whereas the one deflection guide 32 belongs to the frame 1, the other deflection guide 33 is provided on the carriage 3 and delimits the receiver 4 for the plastic panels 5. This deflection guide 33 is provided upstream in the direction of displacement of the carriage 3 with a driver stop 34 which is formed by several stop plates and which according to the illustrated embodiment is displaceable from a driver position according to FIG. 3 to an idle position according to FIG. 4 by means of an actuating shaft 35.

In order to bend a rectangular plastic panel 5, which is placed on the receiver 4 of the carriage 3, into a pipe and to subsequently weld the butt-jointed longitudinal edges 8, 9 of the plastic panel 5 into a pipe with each other, the carriage 3 is moved into the frame 1 with the driver stop 34 that is pivoted into the driver position, wherein the clamping device 7 will be opened and the clamping device 6 is closed with the movable clamping bar 11 placed against the stationary clamping bar 10. The plastic panel 5, which rests flat on the support 4 of the carriage 3, will therefore be conveyed via the driver stop 34 by the carriage 3 according to FIG. 1 against the deflection guide 32 belonging to the frame 1 in order to be rolled up along said deflection guide 32 about 180° and to be pressed with its longitudinal edge 8 by the opened clamping device 7 against the clamping bar 11 of the closed clamping device 6, as is shown in FIG. 3. The clamping bar 11 of the clamping device 7 therefore forms in this position a stop 36 for the alignment of the longitudinal edge 8, which in this stop position can be tightly held by closing the clamping device 7.

For the purpose of rolling up the opposite longitudinal edge 9 of the plastic panel 5, the carriage 3 will be moved back slightly, so that space is provided for pivoting the driver stop 34 to the idle position, and it is then travelled further into the frame 1 with the effect that the plastic panel 5, which is clamped in the clamping device 7 and rests on the deflection guide 32 associated with the frame, will enter the deflection guide 33 of the carriage 3 with its longitudinal edge 9 and is bent in the opposite direction in relation to the already rolled up longitudinal edge 8 by 180° and is conveyed against the clamping device 6 which has been opened for this purpose until the longitudinal edge 9 strikes the aligned, tightly held longitudinal edge 8 in a butt-jointed manner, so that this joining position of the butt-jointed longitudinal edges 8, 9 can be fixed by closing the clamping device 6 for the subsequent welding process. The butt joint between the two longitudinal edges 8, 9 of the plastic panel that is bent into a tube extends centrally in the gap 21 between the two stationary clamping bars 11 of the clamping devices 6, 7, which represents an advantageous precondition for precise welding which is performed by means of the welding device 25 when said welding device is displaced along its guide 22 and therefore along the weld seam to be produced.

After the welding of the butt-jointed longitudinal edges 8, 9 of the plastic panel 5 bent into a pipe, the clamping devices 6, 7 can be opened for removing the produced tubular lining for a concrete pipe. Since the welded lining can only be withdrawn in the axial direction from the movable clamping bars 11 in the interior of the pipe, the support device 16 needs to be opened by activating the actuating cylinder 20, wherein the bearing receiver 18 is pivoted away according to FIG. 5 from the pin 19 at the free end 15 of the support 13, and the support end 15 will be released, so that the circumferential enclosed lining formed by the welded plastic panel 5 can be drawn off axially from the support 13 and the clamping devices 6, 7.

As is shown in closer detail in FIG. 4, the deflection guide 33 associated with the carriage 3 is moved for disturbance-free introduction of the longitudinal edge 9 of the plastic panel 5 into the opened clamping device 6 close to this clamping device. In the case of larger circumferential lengths of the tubular linings to be produced, this means that there needs to be sufficient space for the plastic panel 5 which is limited in respect of its height by the carriage 3 itself. The deflection guide 32 which belongs to the frame 1 can therefore be displaceably mounted in the frame in the direction of displacement of the carriage 3. The frame 1 is provided for this purpose with a guide 37 which accommodates a slide 38 for the deflection guide 32. The slide 38 with the deflection guide 32 can therefore respectively be displaced by means of a drive 39 according to the respective requirements.

The invention claimed is:

1. An apparatus for welding butt-jointed longitudinal edges of a plastic panel to form a tubular lining of a wastewater pipe, the apparatus comprising:
    a retainer for the butt-jointed longitudinal edges comprising first and second clamping devices,
    wherein each clamping device comprises a stationary clamping bar on the outside of the pipe, a movable clamping bar on the inside of the pipe, and an actuating drive connected to the movable clamping bar,
    wherein the stationary clamping bars are located opposite of one another with respect to the butt joint between the two longitudinal edges such that a gap is provided between the stationary clamping bars which exposes the butt-jointed longitudinal edges,
    wherein at least one of the two movable clamping bars forms a stop for one longitudinal edge of the plastic panel in a position placed against the associated stationary clamping bar,
    a welding device, and
    a guide provided along the gap between the stationary clamping bars for guiding the welding device along the gap.

2. An apparatus according to claim 1, wherein the movable clamping bars are arranged with their actuating drives on a freely protruding support which is parallel to the stationary clamping bars.

3. An apparatus according to claim 2, wherein a releasable support device is provided for a free end of the protruding support.

4. An apparatus according to claim 1, further comprising:
    a first deflection guide associated with the two clamping devices for bending the plastic panel into a pipe,
    a carriage displaceable transversely to the two deflection guides, the carriage comprising a driver stop for the plastic panel, and
    a second deflection guide provided on the carriage,
    wherein the driver stop is positioned upstream of the second deflection guide on the carriage and is displaceable between an idle position and a driver position.

5. An apparatus according to claim 4, wherein the first deflection guide is positioned opposite of the second deflection guide and the first deflection guide is displaceable transversely to the associated clamping devices.

6. An apparatus according to claim 1, further comprising:
    a milling device arranged upstream of the welding device.

* * * * *

UNITED STATES PATENT AND TRADEMARK OFFICE
CERTIFICATE OF CORRECTION

PATENT NO. : 9,016,343 B2  
APPLICATION NO. : 13/997377  
DATED : April 28, 2015  
INVENTOR(S) : Schluesselbauer Page 1 of 1

It is certified that error appears in the above-identified patent and that said Letters Patent is hereby corrected as shown below:

In the Claims

In Column 6, line 57 (in Claim 5), after "the" please delete: "associated".

Signed and Sealed this
Eleventh Day of August, 2015

Michelle K. Lee
*Director of the United States Patent and Trademark Office*